Nov. 5, 1968    R. MARIE    3,408,964
AUTOMATIC BAKING APPARATUS
Filed Oct. 14, 1966    3 Sheets-Sheet 1

INVENTOR:
Roland Marie
BY:
Lawrence E. Laubscher
ATTORNEY.

INVENTOR:
Roland Marie
BY:
Lawrence E. Laubscher
ATTORNEY.

Nov. 5, 1968

R. MARIE 3,408,964

AUTOMATIC BAKING APPARATUS

Filed Oct. 14, 1966

INVENTOR:
Roland Marie
BY:
Lawrence E. Laubscher
ATTORNEY.

3,408,964
AUTOMATIC BAKING APPARATUS
Roland Marie, 83 Rue Rechossiere, Aubervilliers,
Seine-St. Denis, France
Filed Oct. 14, 1966, Ser. No. 586,785
Claims priority, application France, Oct. 27, 1965,
36,398
9 Claims. (Cl. 107—58)

ABSTRACT OF THE DISCLOSURE

Automatic baking apparatus including a rotating drum the outer periphery of which contains a plurality of circumferentially arranged recesses for receiving dough, and lid means for closing the recesses during baking of the dough. The invention is characterized in that at least one lid is pivoted at one end adjacent one end of the drum, another lid is pivoted at one end adjacent the other end of the drum, said lids having such a length and being so arranged that their adjacent ends overlap to facilitate closing and locking of the lids.

---

This invention relates generally to apparatus for automatically and uniformly baking dough products, such as tartlets, and more particularly to apparatus including a rotatably-driven hollow cylindrical drum containing on its outer periphery a plurality of recesses for receiving the unbaked dough products, a plurality of lids pivotally connected with the drum for movement between closed and open positions relative to the recesses, and means for automatically closing and fastening said lids during travel thereof past stationary heating means arranged adjacent the drum.

In the known apparatus for baking tartlets and other similar dough products, the mold is initially lined with dough either by hand or by mechanical means. In the first case, the dough is rolled and a circular portion having a diameter slightly greater than that of the mold is cut or punched from the flattened mass. In the second case, the mold is lined with dough by compression, and the surplus dough is cut off at the borders of the mold. In each case, a wood or metal matrix or mandrel is inserted within the lined mold so that the bottom of the crust will not puff up or expand beyond a desired limit during baking. The molds thus prepared are then placed on a pan for insertion within the oven.

These known baking devices and methods have several drawbacks. First, the individual molds and mandrels must be handled separately, thus increasing labor costs. Secondly, the molds and pans are normally placed in the preheated oven while in a cold state, so that an appreciable amount of time is lost in bringing the molds up to the baking temperature. Furthermore, in the case of flaky dough, the expansion due to rising often causes displacement of the mandrels relative to the mold, thereby reducing the quality and uniformity of the resultant baked products. The present invention was developed to avoid the above and other drawbacks of the known devices and to provide an apparatus for quickly and efficiently producing high quality baked products with a minimal amount of labor.

The primary object of the present invention is to provide baking apparatus including a continuously driven rotary drum the outer periphery of which contains recesses for receiving the dough products to be baked. Lids are connected with the drum for pivotal movement between open and closed positions relative to the recesses. When in the closed positions, the lids confine the products within the recesses during rising of the dough, means being provided for closing and locking the lids to the drum as the recesses and lids are displaced toward stationary heating means during rotation of the drum. In the preferred embodiment of the invention, the lids are circumferentially arranged in longitudinally-extending successive pairs the adjacent ends of which overlap and the remote ends of which are pivotally connected with the ends of the rotating drum.

A more specific object of the invention is to provide baking apparatus of the type described above wherein the drum rotates about a horizontal axis, and the means for locking the lids in the closed position includes pressure roller means that force the uppermost one of the overlapping lids downwardly toward the drum to effect engagement between hook means on the lid and pivotal latch means on the drum. Preferably the pressure roll means includes spring biasing means, and means for adjusting the pressure of the biasing means. The spring biasing means includes at least two springs having different resilient strengths, whereby a progressive tightening of the lids is achieved in accordance with the consistency of the dough. Stationary cam track means are provided for releasing the pivotal latch means to open the lids following completion of the baking process.

According to a further feature of the invention, the means for driving the baking drum includes a motor-driven pinion that drives a sectional ring gear the sections of which are carried by the outer surfaces of the lids. The pinion is arranged adjacent the heating means, so that engagement between the gears is achieved after the lids have been closed and locked in place.

Other objects and advantages of the invention will become apparent from a study of the following specification when considered in conjunction with the accompanying drawing, in which.

Figure 1:
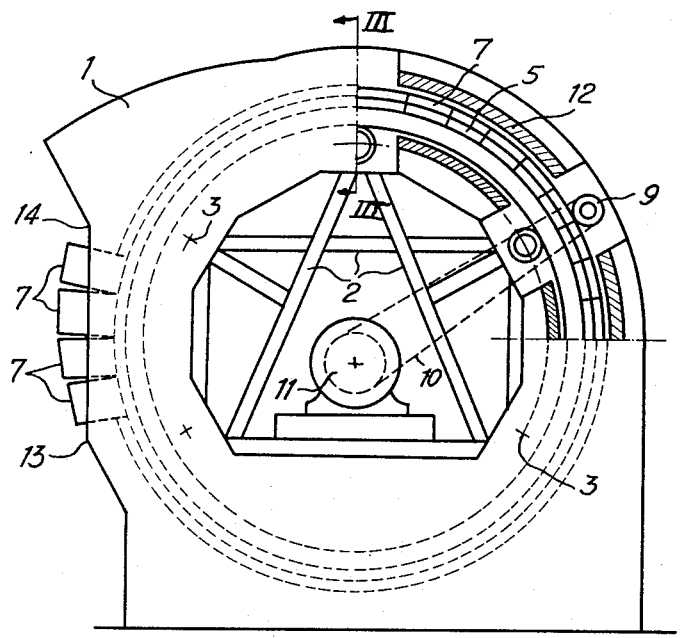
FIG. 1 is a partly sectioned end elevational view of the automatic baking apparatus.
Figure 3:
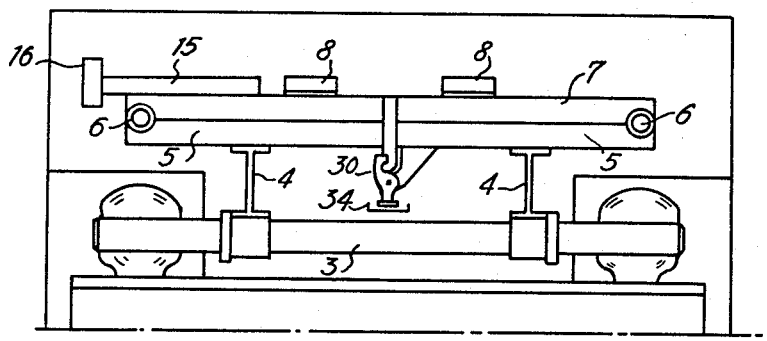
FIG. 3 is a sectional view taken along line III—III of FIG. 1.
Figure 6:
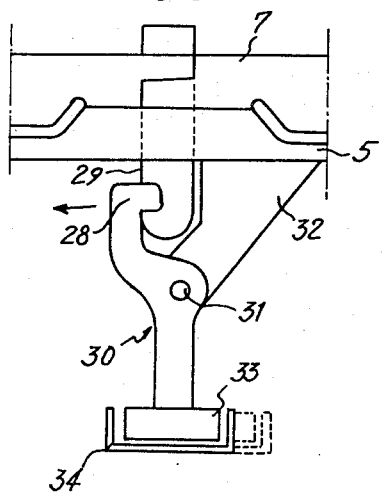
FIG. 6 is a detailed view of the lid locking means.

Referring first more particularly to FIGS. 1 and 3, the baking machine includes a casing or frame 1, formed of sheet metal or the like, including rigid girders 2 that support bearings 3 upon which is journalled a pair of parallel circular rails 4. Secured to the rails 4 is a hollow cylindrical drum 5 the outer periphery of which contains a plurality of recesses 5a for receiving the unbaked dough products (for example, tartlets). Pivotally connected at one end to the ends of the cylindrical member 5 by pivot axis 6 are a plurality of circumferentially arranged lids 7 that are pivotable between open and closed positions relative to the recesses 5a, respectively. The lengths of the lids 7 are slightly greater than half the length of the cylindrical member 5, and associated pairs of first and second lids connected at opposite ends of the cylindrical member 5 are adapted to overlap at their free ends as shown in FIG. 6. On their outer surfaces, the lids carry the sections of a ring gear 8 that is driven by motor 11 via endless chain 10 and pinion 9, so that the cylindrical member 5 is continuously driven in a given direction about a horizontal axis.

Figure 2:
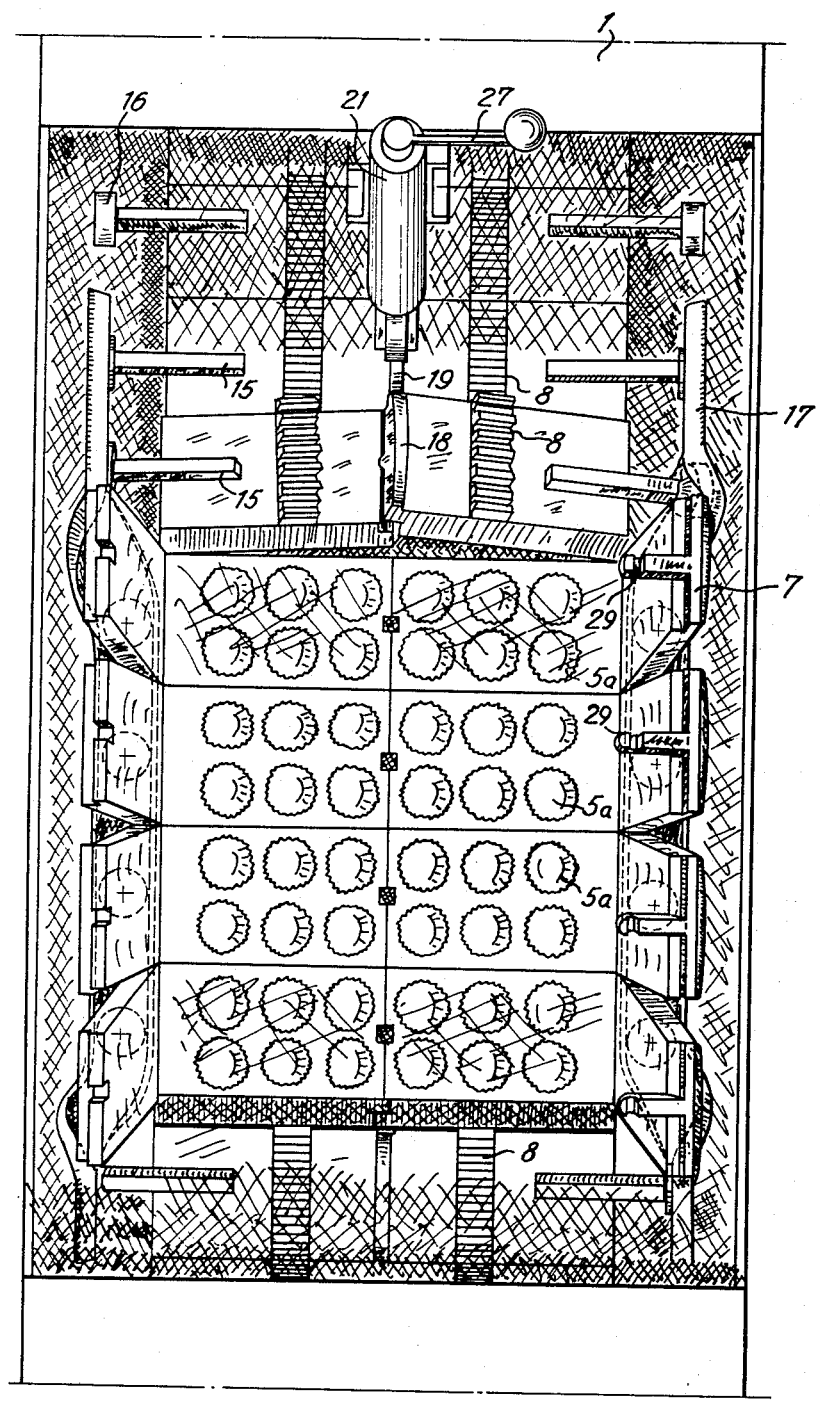
FIG. 2 is a detailed side elevational view taken from the left hand side in FIG. 1, a plurality of the lids being shown in the open position.
Figure 4:
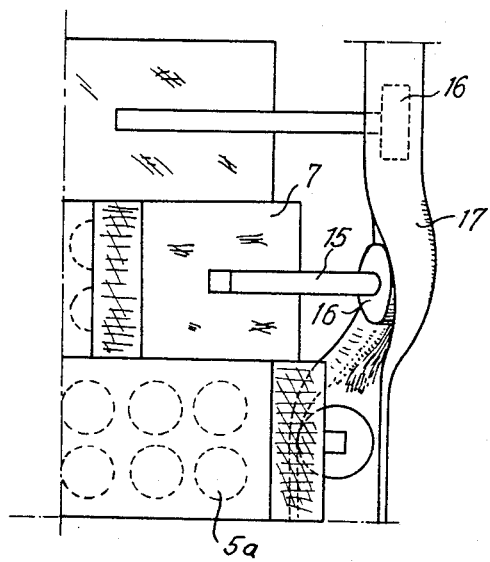
FIG. 4 is a detailed view of the cam track and follower means for operating the lids between their open and closed positions.

Secured in the casing 1 adjacent the periphery of the drum 5 is a heating plate 12 for baking the dough products that are inserted into the recesses 5a when the lids 7 are in the open position. In accordance with one feature of the invention, means are provided for opening the lids 7 as they pass by an opening in the casing 1 defined between the points 13 and 14 in FIG. 1, and for pivoting the lids toward the closed position as they approach the heating means 12 during rotation of the drum. These lid operating means include operator members 15 that are secured at one end to the upper surfaces of the lids and carry at their free ends rollers 16 that extend within a pair of stationary roller guide tracks 17 (FIGS. 2 and 4) secured to the casing 1 adjacent the ends of drum 5. As shown in FIG. 2, the four open rows of cover pairs expose a plurality of recesses 5a in the periphery of the drum, the unbaked dough products being inserted within the recesses either automatically or by hand. The guide tracks 17 are so contoured that the covers 7 open adjacent point 13 and close adjacent point 14 during rotation of the drum in the clockwise direction.

In the case of a flaky dough product, a considerable opening pressure is applied to the lids by the rising of the dough during the baking process. To counteract this pressure, lid tightening and locking means are provided as illustrated in FIGS. 5 and 6, respectively.

Figure 5:
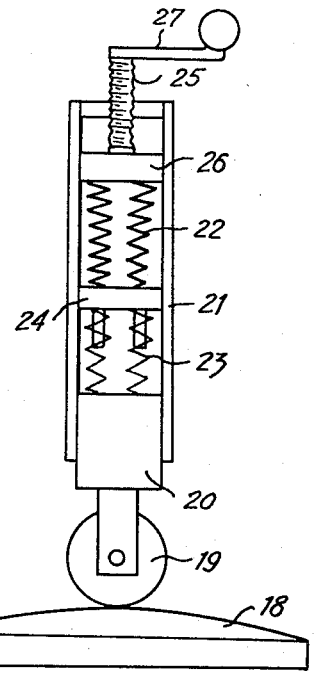
FIG. 5 is a detailed view of the pressure roller lid tightening means.

As shown in FIGS. 2 and 5, the lid tightening means comprise a pressure cam surface 18 carried by the upper surface of each of the uppermost overlapping lids 7 for actuation by a pressure roller 19. This roller 19 is secured to a piston 20 that is slidably guided in a housing 21 secured to the casing 1 at a location between the point 14 and the heating means 12. Strong spring means 22 and weak spring means 23 arranged between plates 24 and 26 and between piston 20 and plate 24, respectively, bias roller 19 relative to housing 21 in the direction of cam surface 18. The pressure of the spring set may be manually adjusted by means of screw 24 and crank 27, rotation of which varies the position of upper plate 26 relative to the housing 21.

Following tightening of the lids 7 by the tightening means of FIG. 5, the lids are locked by the locking means of FIG. 6. These locking means comprise a plurality of hooks 29 secured to the uppermost ones of the overlapping lids, respectively, for engagement by the latch portions 28 of levers 30 that are pivoted on pivot shafts 31 carried by extensions 32 on drum 5, respectively. For pivoting each of the levers 30 about its pivot shaft 31 between a released position and the illustrated locked position, the lever 30 carries at its free end a roller 33 that extends within stationary guide track 34 having, in cross-section, a U-shaped configuration. The position of roller 33 and track 34 for effecting pivotal movement of lever 30 to the released position is shown in phantom in FIG. 6.

The drum 5 is driven by motor 11 at such a speed that comple baking of a product (such as a flaky dough tartlet) is accomplished during one revolution of the drum. The baked tartlets are deposited by gravity into a suitable receptacle placed adjacent the point 13 on FIG. 1.

The apparatus described above permits automatic, continuous baking of dough products in simple labor-saving manner. While in accordance with the provisions of the patent statutes, the preferred form and embodiment of the invention has been illustrated and described, it will be apparent to those skilled in the art that various modifications and improvements may be made in the apparatus described without deviating from the invention set forth in the following claims.

What is claimed is:

1. Apparatus for baking dough products, such as tartlets, in a continuous manner, comprising:

a rotary drum containing on its outer periphery first and second longitudinally spaced groups of circumferentially arranged recesses, the recesses of said second group corresponding with and being spaced longitudinally from the recesses of said first group, respectively;

first and second groups of lids pivotally connected with said drum for closing said groups of recesses, respectively, the first group of lids being pivoted at one end adjacent one end of the drum, and the second group of lids being pivoted at one end adjacent the other end of the drum, at least one lid of the first group and the corresponding lid of the second group having such lengths that the first lid partially overlaps the adjacent end of the second lid when the lids are closed upon their respective recesses;

stationary heating means arranged adjacent the periphery of said drum for heating the dough to baking temperature;

and lid closing means for placing the lids in their closed positions during travel of the drum relative to said stationary heating means.

2. Apparatus as defined in claim 1 wherein the axis of rotation of said drum is horizontal.

3. Apparatus as defined in claim 1 wherein said lid closing means comprise lid tightening means operable during rotation of said drum for successively displacing the lids of said first group downwardly upon the lids of said second group, respectively, and lid locking means for positively locking the lids in the closed position.

4. Apparatus as defined in claim 3, wherein said lid tightening means comprise stationary friction roller means arranged forwardly of said heating means relative to the direction of rotation of said drum, the outer surfaces of said first lids including cam means arranged for engagement by said friction roller means to progressively urge the first and second lids toward their closed positions.

5. Apparatus as defined in claim 4 wherein said friction roller means comprises a stationary housing, a roller mounted for sliding movement relative to said housing, spring means biasing said roller relative to said housing in the direction of said cam means, and means for adjusting the pressure of said spring means in accordance with the consistency of the unbaked dough product.

6. Apparatus as defined in claim 5 wherein said spring means include a plurality of springs having different resilient strengths.

7. Apparatus as defined in claim 3 wherein said lid locking means comprises a plurality of hooks on said first lids, respectively, a plurality of latches pivotally connected with said drum for engagement with said hooks, respectively, and stationary cam track means adjacent said drum for operating said latches between locked and released positions relative to said hooks, respectively.

8. Apparatus as defined in claim 1 wherein said lid closing means comprises a plurality of lid operator members secured at one end with said lids, respectively, a plurality of follower means secured to the other ends of said operator members, respectively, and a pair of guide track means arranged adjacent the ends of said drum, respectively, for receiving the follower means associated with said first and second lids, respectively, said guide track means being operable to close said lids as they approach the heating means during rotation of the drum and to open said lids as they leave the heating means.

9. Apparatus as defined in claim 1, and further including means for rotating said drum, comprising at least one motor-driven pinion adjacent said heating means, and a sectional ring gear driven by said pinion, the sections of said ring gear being carried by the outer surfaces of said lids, whereby said pinion cooperates with said ring gear sections when the lids are in the closed position.

References Cited

UNITED STATES PATENTS 880,497    3/1908    Bates _____ 107—58

WALTER A. SCHEEL, *Primary Examiner.*

JOSEPH SHEA, *Assistant Examiner.*